United States Patent [19]

Hubbard

[11] 4,174,310

[45] Nov. 13, 1979

[54] PROCESS FOR PRODUCING AQUEOUS UREA-FORMALDEHYDE

[75] Inventor: Donald A. Hubbard, Cambridge, England

[73] Assignee: Imperial Chemical Industries Limited, London, England

[21] Appl. No.: 808,429

[22] Filed: Jun. 20, 1977

[30] Foreign Application Priority Data

Jun. 23, 1976 [GB] United Kingdom ............... 26125/76

[51] Int. Cl.² .................... C08G 12/12; C08G 12/32
[52] U.S. Cl. .............................. 260/29.4 R; 528/254; 528/256; 528/259
[58] Field of Search ............... 260/67.5, 67.6 R, 69 R, 260/29.4 R; 528/254, 256, 259

[56] References Cited

U.S. PATENT DOCUMENTS

| | | | |
|---|---|---|---|
| 2,652,377 | 9/1953 | Kise | 260/29.4 R |
| 3,392,150 | 7/1968 | Groll | 260/67.6 |
| 3,450,659 | 6/1969 | Bondi et al. | 260/29.4 R |
| 3,830,783 | 8/1974 | Vargiu et al. | 260/70 A |
| 4,026,980 | 5/1977 | Hubbard | 260/2.5 F X |
| 4,039,496 | 8/1977 | Hermann | 260/67.6 R X |

FOREIGN PATENT DOCUMENTS

| | | | |
|---|---|---|---|
| 2291994 | 6/1978 | France | 260/29.4 |
| 1376385 | 12/1974 | United Kingdom . | |
| 1378388 | 12/1974 | United Kingdom . | |

*Primary Examiner*—Wilbert J. Briggs, Sr.
*Attorney, Agent, or Firm*—Cushman, Darby & Cushman

[57] ABSTRACT

Aqueous urea-formaldehyde resins solutions are prepared by (a) forming a first aqueous solution containing urea and formaldehyde in a molecular ratio in the range urea:formaldehyde = 1:3 to 1:1.5, (b) reacting the first aqueous solution under neutral or alkaline conditions to form a reaction mixture containing substantial amounts of methylol urea products, (c) vacuum evaporating the reaction mixture to produce a concentrated mixture having a solids content of 55% to 80% by weight, and (d) further condensing the concentrated mixture under acid conditions to produce a resinous material. The urea may be wholly or partially replaced by melamine.

9 Claims, No Drawings

PROCESS FOR PRODUCING AQUEOUS UREA-FORMALDEHYDE

This invention relates to a process for producing aqueous urea-formaldehyde solutions, melamine-formaldehyde solutions, and mixtures of urea- and melamine-formaldehyde resin solutions. The invention will primarily be described with reference to aqueous urea-formaldehyde resin solutions.

Known methods for producing aqueous urea-formaldehyde resin solutions are as follows:

1. The condensation of urea with standard 36% HCHO w/w formalin (e.g 35%–45% w/w HCHO) at about 45%–50% w/w solids content, followed by vacuum distillation to produce a final solids content between 55% and 80% by weight.
2. The condensation of urea with stripped formalin of about 50% HCHO w/w or more. In this method no vacuum distillation is required.
3. The condensation of commerical UREAFORM (Registered Trade Mark) with added urea to produce a resin solution having the final solids content desired without vacuum distillation. UREAFORM is essentially stripped formalin as used in method 2 above, but stabilised with urea in smaller amounts than those required for the subsequent production of urea-formaldehyde resins.

The above known methods have various disadvantages depending upon the method. These are as follows:

Method 1, which has been in common use for many years, is generally rather lengthy and requires excessive plant capacity due to the unwanted water present until the final process step is carried out.

Method 2 permits the manufacture of substantially increased tonnages of final product from a resin plant of any given size but has the disadvantage that concentrated formalin is highly unstable and difficult to transport. A further problem with method 2 is that the energy cost of concentrating formalin before the reaction with urea is greater than that required to vacuum evaporate the low solids resin solution produced in method 1.

Method 3 uses UREAFORM, which is a stable product and clearly avoids the stability problem of method 2. However the higher cost of stripping weak formalin solutions still remains. Additionally the conversion of UREAFORM to useful commercial urea-formaldehyde resins is more difficult than the conversions in methods 1 and 2, owing to the need for very careful monitoring of the extra urea additions required and these steps can frequently be extremely lengthy and therefore costly. This is evident from U.K. Pat. Nos. 1,376,385 and 1,376,388.

According to the present invention we provide a process for producing aqueous urea- and/or melamine-formaldehyde resin solutions which comprises the steps of (a) forming a first aqueous solution containing urea and/or melamine and formaldehyde in a molecular ratio within the range urea and/or melamine:formaldehyde = 1:3 to urea and/or melamine:formaldehyde = 1:1.5, (b) reacting the first aqueous solution under neutral or alkaline conditions to form a reaction mixture containing substantial amounts of methylol urea and/or methylol melamine products, (c) vacuum evaporating the reaction mixture to produce a concentrated mixture having a solids content of 55% to 80% by weight and (d) further condensing the concentrated mixture under acid conditions to produce a resinous material.

In particular, according to the present invention we provide a process for producing aqueous urea-formaldehyde resin solutions which comprises the steps of (a) forming a first aqueous solution containing urea and formaldehyde in a molecular ratio within the range urea:formaldehyde = 1:3 to urea:formaldehyde = 1:1.5, b) reacting the first aqueous solution under neutral or alkaline conditions to form a reaction mixture containing substantial amounts of methylol urea products, (c) vacuum evaporating the reaction mixture to produce a concentrated mixture having a solids content of 55% to 80% by weight, and (d) further condensing the concentrated mixture under acid conditions to produce a resinous material.

Suitably the amounts of methylol urea and/or methylol melamine products in the reaction mixture comprise upwards from 80% by weight of the reactants, i.e less than about 10% by weight of the formaldehyde present is in the form of free formaldehyde.

The first aqueous solution may be formed by any conventional process using urea and/or melamine and standard commercial formalin (e.g about 37% w/w) at a neutral or near neutral pH. At urea:formaldehyde molecular ratios of 1:2 or less there is almost complete reaction of urea with formaldehyde in the cold to produce essentially a low solids content UREAFORM-type material but of limited stability. The material produced however, differs completely from known commercial UREAFORM in that its molecular ratio is already correct for the next stage of resin condensation without necessarily needing modification in any way—such as the addition of further quantities of urea. However, we do not preclude the addition of minor amounts (e.g less than 10% by weight of the reactants) of urea and/or melamine or formalin to adjust concentrations at this stage. The first aqueous solution may be reacted, e.g by leaving for 12 to 36 hours (preferably about 24 hours) at ambient temperature or by heating for 10 to 60 (preferably 15 to 30) minutes at 50° C. to 100° C. to produce the reaction mixture. The reaction mixture may then be, immediately if so desired, vacuum-evaporated from its initial solids content of approximately 45% by weight up to the solids content required within the range 55% to 80% by weight—say 70% by weight for example.

The concentrated mixture thus formed is a clear non-resinous product which is further condensed, e.g by heating to 70°–100° C. at atmospheric pressure, under mildly acid conditions which may range from pH 4.5 to 6.5, preferably pH 5 to 6.5. The temperature may be slightly higher than 100° C. if this step is carried out under a pressure slightly higher than atmospheric pressure. During or after this step further urea may be added to the mixture, as is often the practice in conventional production methods.

After vacuum evaporation the temperature of the concentrated mixture produced is preferably not allowed to fall before the condensation step is commenced.

After vacuum evaporation no further evaporation is required, and at the end of the resin-forming step the product is suitably cooled and its pH increased, preferably to between 7.0 and 8.0.

Any formaldehyde and/or methanol fractions derived from the vacuum evaporation step may be collected and included in the feedstock for conventional formalin production in a known manner.

The process lends itself to the production of resins on a continuous basis in that the reaction mixture can be fed through a conventional continuous evaporator and the resin-forming step can then be carried out in one or more continuously stirred tank reactors (CSTR). The process may also be carried out as a batch process in which the concentrated mixture is formed immediately before the resin-forming step.

The resin-forming step may be carried out partially or completely at pressures above atmospheric pressure. This gives materials of improved water resistance. Mixed resins may be formed by resins formed in this fashion being mixed with conventionally-produced resins.

The advantages of the process lie in the ease of evaporation of the reaction mixture (under vacuum). The energy consumption is materially lower than that required for stripping commercial formalin in a stripping column and the evaporation rates can be substantially higher than those obtained during vacuum evaporation of a viscous urea-formaldehyde resin solution because there is practically no increase in viscosity during the evaporation step. At the same time full advantage can be taken of the fast throughput in the final step equivalent to that obtained from the use of concentrated formalin solution as a starting material.

By comparison with the known processes described above we estimate that production rates can be increased by at least 2.6 times in a single vessel used both as a reactor and an evaporator, and by at least 1.6 times in a system using a vessel for reaction only and a conventional evaporator for the concentration step.

The process is very suitable for preparing low cost resins.

In the following Examples, formalin with a formaldehyde content of 36.5% by weight, a methanol content of 5.8% by weight, and an acidity of about 0.02% by weight was used. pH adjustments were made using very small amounts of 2 N NaOH solution or 10% formic acid solution.

EXAMPLE 1

Resins made on 5 liter scale

A. (for comparison)

A mixture of formalin and urea, at a molar ratio of formaldehyde: urea of 2.1:1, was prepared. The total weight of the mixture was 4.94 Kg. The mixture was charged to a reaction vessel, adjusted to pH 7, and heated to reflux for 30 minutes. The pH was then reduced to 5.05 and the mixture further refluxed for 55 minutes. The reactants were then adjusted to pH 6.0, cooled to 50° C., and a further charge of urea was added to bring the overall ratio of formaldehyde:urea to 1.5:1. The mixture was neutralised to pH 7, and evaporated under reduced pressure at 44°-46° C. The times taken for the process were:

| Neutral reflux | 30 minutes |
| --- | --- |
| Acid reflux | 55 minutes |
| Evaporation | 135 minutes (to remove 1.331 of distillate) |
| Warming time | 20 minutes |
| Cooling time | 15 minutes (including urea addition) |
| Mixing time | 15 minutes |
| Total time | 270 minutes, to produce 3.85 Kg | of resin with the following characteristics:

| Water tolerance | 260% |
| --- | --- |
| Viscosity | 3.6 poise |
| SG | 1.295 |
| Solids content | 67.6% by weight |

B (using the present invention)

The same charge as in A above was prepared, adjusted to pH 7, and warmed to 50° C. for about 15 minutes. The mixture was then charged to a vessel and evaporation under reduced pressure at 44°-46° C. was commenced. After about a liter of distillate had been removed, a further half-charge of mixed reactants, at pH 7, was introduced and evaporation to the desired level was completed. The pH was then reduced to 5.2 and the reaction proceded vigorously for 12 minutes. The pH was raised to 5.8, the mixture was cooled to 50° C. and urea was added to bring the formaldehyde:urea ratio to 1.5:1. At 40° C., the pH was finally adjusted to 7.2 to give the final resin.

The process times were:

| Mixing and warm-up | 50 minutes |
| --- | --- |
| Evaporation time | 120 minutes (to remove 2.231 of distillate) |
| Acid reflux | 12 minutes |
| Cooling time (and urea addition) | 14 minutes |
| Total time | 196 minutes to produce 5.7 Kg of resin | with the following characteristics:

| Water tolerance | 280% |
| --- | --- |
| Viscosity | 5.9 poise |
| SG | 1.288 |
| Solids content | 66.4% by weight |

EXAMPLE 2

A mixture of formalin and urea (molar ratio of formaldehyde:urea 1.95:1) was adjusted to pH 7 and allowed to stand at a temperature of 40°-50° C. for 30 minutes. The mixture was then concentrated by vacuum evaporation until 23% of the weight of the mixture had been collected as distillate. The concentrate was then refluxed at pH 5.3 for 28½ minutes. During the process, the extent of reaction was monitored by measuring the volume of water required to bring about precipitation of resinous material. A resin of viscosity 17.5 poise and SG 1.285 was obtained.

In a comparative experiment an unconcentrated mixture of the same proportions as above was first refluxed at pH 7 for 30 minutes, and then refluxed at pH 5.05 until the degree of reaction (as measured by precipitation, and allowing for differences in concentration) was the same as before. The acid reaction in this case took 76 minutes.

Example 1 and 2 above demonstrate the advantages in speed of reaction and concentration which can result from the present invention, and the utility of the resins obtained. The following examples demonstrate the reproducability of the novel stage of concentrating a mixture of ordinary formalin and urea, and the applicability of the process for industrial uses.

EXAMPLE 3

A series of experiments were performed to measure the changes in composition occuring during the evaporation of a formalin/urea premix, and the effect of different types of thermal treatment prior to evaporation. All evaporations were performed under reduced pressure and at an evaporation rate of about 5 ml/minute (except where shown). All premixes were adjusted to pH 7 (except where shown). The temperature of evaporation was as indicated; however where the premix had been heated above the evaporation temperature vacuum was applied at this temperature to assist in the cooling. The distillate was analysed for free formaldehyde, and a progressive but usually small amount of formaldehyde was found to be evolved. The concentration of formaldehyde in the first 10% of the distillate was found to be approaching twice that of the overall concentration of formaldehyde in the distillate. The results are presented in the following table.

In another comparative experiment, a similar reaction was performed, except that before evaporation urea was added to reduce the formaldehyde:urea ratio to 1. 6:1. Evaporation took 81 minutes, (rate 3.4 mls/minutes). The results were as follows:

|  | Evaporation Temperature °C. | Initial* Concentration % by wt | Final* Concentration % by wt | Formaldehyde : urea | | % by wt formaldehyde in distillate |
|---|---|---|---|---|---|---|
|  |  |  |  | Initial | Final |  |
| No added urea (S). | 64–66 | 53 | 76 | 2.0 | 1.95 | 2.37 |
| With added urea | 64–67 | 56 | 78 | 1.6 | 1.58 | 1.09 |

*Again, calculated concentrations of urea + formaldehyde, not allowing for any elimination of water during reaction. Therefore not equivalent to solids content as measured on U.S. resin.

These experiments demonstrate the following points:
(a) That mixtures of urea and formalin can be concentrated to, and even beyond, the normal concentrations of urea formaldehyde resins.
(b) That losses of formaldehyde are surprisingly small, and that concentration of formaldehyde in the distillate is similar, and sometimes less than that of distillates obtained from conventional evaporation of urea formaldehyde resins.
(c) That formaldehyde losses can be reduced by a thermal treatment of the mixture before evaporation.
(d) That the conditions of the thermal pretreatment, and of the evaporation do not need unreasonably precise control in order to obtain predictable and

TABLE I

| Temperatures of thermal treatment of premix | Time of treatment | Temperature of evaporation °C. | *Initial concentration % by wt | *Final concentration % by wt | Molar ratio formaldehyde: urea | | Concentration of formaldehyde in distillate % by wt |
|---|---|---|---|---|---|---|---|
|  |  |  |  |  | Initial | Final |  |
| None | — | 47–48 | 52 | 83 | 2.1 | 1.96 | 5.10 |
| 23° C. | 17 hours | 46–48 | 52 | 79 | 2.1 | 2.03 | 2.63 |
| 50° C. | 30 mins | 47 | 52 | 79 | 2.1 | 2.03 | 2.66 |
| 50° C. | 30 mins | 47 | 54 | 81 | 1.95 | 1.89 | 2.19 |
| 50° C. | 30 mins at pH 9 | 46–47 | 54 | 80 | 1.95 | 1.89 | 2.40 |
| 80° C. | 30 mins | 66–68 | 53 | 78 | 2.0 | 1.95 | 1.79 |
| 80° C. | 60 mins | 65–68 | 53 | 78 | 2.0 | 1.96 | 1.57 |
| 80° C. | 120 mins | 65–67 | 53 | 80 | 2.0 | 1.97 | 1.17 |
| 90° C. | 15 mins | 65–67 | 53 | 78 | 2.0 | 1.95 | 1.97 |
| 90° C. | 60 mins | 64–67 | 53 | 79 | 2.0 | 1.97 | 1.36 |
| Reflux (98° C.) | 15 mins | 66–68 | 53 | 80 | 2.0 | 1.96 | 1.72 |
| Reflux | 30 mins | 58 | 52 | 80 | 2.1 | 2.07 | 1.34 |
| Reflux | 30 mins | 47–48 | 54 | 81 | 1.95 | 1.92 | 0.96 |
| Reflux | 10 mins | 66–68 | 53 | 80 | 2.0 | 1.96 | 1.60 |
| Reflux | 10 mins | 64–68 (evaporation rate = 3.3 mls/min) | 53 | 77 | 2.0 | 1.96 | 1.68 |
| P.Reflux | 30 mins | 53–56 | 56 | 74 | 1.7 | 1.69 | 0.79 |
| Q.Reflux | 30 mins | 56–57 | 51 | 67 | 2.5 | 2.43 | 2.20 |
| R.Reflux | 10 mins | 65–67 | 54 | 72 | 2.0 | 1.96 | 2.50 |

*Calculated concentrations of urea + formaldehyde

As a comparison, a resin was prepared by conventional means by mixing formalin and urea (formaldehyde:urea 2:1), and first refluxing at pH 7 for 10 minutes. The mixture was then refluxed at pH 5.05 for 42 minutes, and the reaction monitored by measuring the amount of water required to cause precipitation of a sample. The reactants were then adjusted to pH 6.6, cooled to 70° C., and further adjusted to pH 7.2. The mixture was vacuum-concentrated. The average evaporation rate was 3.5 mls/minute (total time 80 minutes). Analysis of the distillate was performed as above.

consistent mixtures for subsequent resinification.

EXAMPLE 4

Resins were prepared from some of the mixtures described in Example 3. The mixtures used are those marked P, Q, R and S. P, Q and R were condensed according to the present invention, while S has already been described as a comparative example. The times, pH values and other parameters of the condensation and evaporation were as follows:

|  |  | P | Q | R | S |
|---|---|---|---|---|---|
|  | Formaldehyde: Urea ratio- |  |  |  |  |
|  | Initial | 1.7:1 | 2.5:1 | 2.0:1 | 2.0:1 |
|  | Final | 1.69:1 | 2.43:1 | 1.96:1 | 1.95:1 |
| Pretreatment | Mix and pH adjustment (pH7) | 10 | 13 | 10 | 10 |
|  | Warm up time (mins) | 12 | 14 | 15 | 15 |
|  | Reflux time (mins) | 30 | 30 | 10 | 10 |
|  | Rig for evaporation (mins) | 5 | 5 | 6 | — |
| Evaporation | Evaporation time (mins) | 60** | 68** | 64** | 80 |
|  | Temperature °C. | 53–56 | 56–57 | 65–67 | 64–66 |
|  | Pressure (mm Hg) | 200 | 200 | 300 | 300 |
|  | Evaporation rate (mls/min) | 5.7 | 5.2 | 5.5 | 3.5 |
| Reaction | Warm up time (mins) | 12 | 12 | 8 | — |
|  | pH | 5.45 | 5.25 | 5.5 | 5.05 |
|  | Reaction time | 15 | 50 | 31 | 42 |
| Cool and | Time (min) | 13 | 10 | 10 | 22 |
| Neutralise | Final pH | 7.6 | 7.4 | 7.7 | 7.2 |
|  | Weight of resin (g) | 965 | 935 | 900 | 620 |
|  | Total time (min) | 157 | 202 | 154 | 179 |
| Resin | Viscosity (poise) | 50 | 6.5 | 30 |  |
|  | Specific gravity | 1.275 | 1.275 | 1.282 |  |
|  | Water tolerance (%) | 120 | 1600 | 220 |  |

**Premix was progressively run into the vessel to keep it full
*Evaporation as final stage in conventional process Thus, we have found (advantageously and surprisingly) that during the evaporation of the reaction mixture the loss of formaldehyde is reproducible and in many cases very small. This is particularly the case if the ratio of formaldehyde:urea is less than 2:1, and if the reactants are heated above 50° C. for more than say 15 minutes before evaporation. The amount of formaldehyde lost in the distillate is dependent principally upon the formaldehyde:urea ratio and pretreatment conditions of the evaporation. In many cases the loss of formaldehyde on evaporation can be less than that encountered in concentrating resins made by conventional methods.

Minor quantities of known additives may be incorporated into the aqueous urea-formaldehyde resin solutions. Such known additives include, inter alia, phenol, resorcinol, cresol, guanidine, thiourea, and they may be incorporated into the solutions after their preparation is complete or at any stage during their preparation.

The invention has been described hereinabove with particular reference to urea-formaldehyde resins, but it is equally applicable to melamine-formaldehyde resins (in which all the urea is replaced by melamine) and to melamine-urea-formaldehyde resins (in which up to, say, 50% by weight of the urea is replaced by melamine). The invention may be used, for example, for the production of melamine-formaldehyde condensates for subsequent reaction with alcohols (for example butanol) which produces stable aqueous melamine-formaldehyde concentrates.

The invention is useful in paint resin manufacture where urea-formaldehyde or (more usually) melamine-formaldehyde materials are condensed and then extensively etherified (for example, by butanol) to give an oil-soluble, water-insoluble material. This manufacturing process involves the removal of water by azeotropic distillation of the alcohol and water, the alcohol returned. The reduction in water content at the start (as provided by the present invention) is an advantage, as there is less water to remove and the reactions would proceed more rapidly.

I claim:

1. A process for producing aqueous urea- and/or melamine-formaldehyde resin solutions which comprises the steps of:

(a) forming a first reaction mixture containing substantial amounts of methylol urea and/or methylol melamine products by condensing, under neutral or alkaline conditions, reactants comprising urea and/or melamine and formalin in the form of an aqueous formalin solution (35% to 45% w/w) in a molecular ratio within the range urea and/or melamine:formaldehyde=1:3 to urea and/or melamine:formaldehyde=1:1.5;

(b) vacuum evaporating the reaction mixture to form a concentrated mixture having a solids content of 55% to 80% by weight, and (c) with no further addition of formaldehyde to the concentrated mixture further condensing the concentrated mixture under acid conditions to produce a resinous material.

2. A process as claimed in claim 1, wherein the amounts of methylol urea and/or methylol melamine products in the reaction mixture comprise upwards from 80% by weight of the reactants.

3. A process as claimed in claim 1, wherein the composition of the reaction mixuture is adjusted before vacuum evaporating by the addition thereto of urea and/or melamine or formaldehyde in the form of an aqueous formalin solution containing of formaldehyde, in an amount of less than 10% by weight of the reactants.

4. A process as claimed in claim 1, wherein the reaction mixture is formed by condensation for 12 to 36 hours at ambient temperature.

5. A process as claimed in claim 1, wherein the reaction mixture is formed by condensation for 10 to 60 minutes.

6. A process as claimed in claim 1, wherein the concentrated mixture is further condensed under acid conditions between pH 4.5 to pH 6.5.

7. A process as claimed in claim 6, wherein the further condensation is carried out by heating at 70° C. to 100° C. at atmospheric pressure.

8. A process as claimed in claim 6, wherein the further condensation is carried out by heating at above 100° C. and at above atmospheric pressure.

9. Process as claimed in claim 6, wherein after the said further condensation the product is cooled and its pH is adjusted to a pH value of at least 7.

* * * * *